(12) United States Patent
Ramesh (10) Patent No.: US 6,853,633 B1
(45) Date of Patent: Feb. 8, 2005

(54) METHODS OF PROVIDING SIGNAL PARAMETER INFORMATION USING DELTA-MODULATION AND RELATED SYSTEMS AND TERMINALS

(75) Inventor: Rajaram Ramesh, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 806 days.

(21) Appl. No.: 09/669,361

(22) Filed: Sep. 26, 2000

(51) Int. Cl.$^7$ .............................. H04B 7/212; H04J 3/00; H04J 3/314; H04Q 11/04

(52) U.S. Cl. ........................ 370/347; 370/252; 370/280; 370/282; 370/318; 370/337; 370/442; 375/247; 455/522

(58) Field of Search ................................ 370/252, 278, 370/280, 282, 294, 310, 311, 317, 318, 321, 328, 336, 337, 345, 347, 442; 375/242, 247, 248; 455/13.4, 522

(56) References Cited

U.S. PATENT DOCUMENTS

| | | | |
|---|---|---|---|
| 5,455,967 A | | 10/1995 | Amezawa et al. |
| 5,590,409 A | * | 12/1996 | Sawahashi et al. ............ 455/69 |
| 6,295,289 B1 | * | 9/2001 | Ionescu et al. .............. 370/342 |
| 6,463,295 B1 | * | 10/2002 | Yun ............................ 455/522 |
| 6,493,541 B1 | * | 12/2002 | Gunnarsson et al. .......... 455/69 |
| 2002/0061750 A1 | * | 5/2002 | Mohebbi ..................... 455/437 |

FOREIGN PATENT DOCUMENTS

EP 0 991 205 A2 4/2000

OTHER PUBLICATIONS

Whitehead; *Signal–Level–Based Dynamic Power Control for Co–channel Interference Managment*; Proc. VTC, May 1993 pp 499–502.

Almgren et al; *Power Control in a Cellular System*; IEEE VTC 1994, May 1994 pp 833–837.

Stallings; *Data and Computer Communications*; Data Encoding 1985, pp 84–87.

Ziemer et al; *Systems, Modulation, and Noise*; Principles of Communications pp 141–142.

XIA; "Transmitting Power Control in CDMA Cellular Systems", 1999 IEEE Africon 5$^{th}$, Africon Conference in Africa, Cape Town, South Africa Sep. 10, 1999; pp 141–146 XP000895817.

Ariyavisitakul; "SIR–Based Power Control in a CDMA System", Communication for Global Users, vol. 2, Dec. 6, 1992 pp 868–873, XP000357685.

Copy of PCT Search Report for PCT/US01/26193.

Ericsson; "Fast Power Control Scheme for TDMA6"; Time Division Digital Technology Mobile and Personal Communications Standards; TR45.3.5/00.02.21._; pp 1–5 (Feb. 21–25, 2000).

\* cited by examiner

*Primary Examiner*—Hassan Kizou
*Assistant Examiner*—Ahmed Elallam (57) ABSTRACT

Signal parameter information can be transmitted from a first communications device to a second communications device. For example, communications can be received at the first communications device from the second communications device, and a plurality of samples of a signal parameter can be generated characterizing the received communications. In addition, a plurality of delta-modulation values can be calculated responsive to the respective samples of the signal parameter wherein the plurality of delta-modulation values are associated with corresponding ones of the plurality of samples of the signal parameter characterizing the received communications. The delta-modulation values can be transmitted to the second communications device. Related devices are also discussed.

50 Claims, 7 Drawing Sheets

METHODS OF PROVIDING SIGNAL PARAMETER INFORMATION USING DELTA-MODULATION AND RELATED SYSTEMS AND TERMINALS

BACKGROUND OF THE INVENTION

The present invention relates to the field of communications and more particularly to methods of providing signal-to-interference ratios and related systems and terminals.

In a cellular communications system, it may be desirable to dynamically control a power of downlink transmissions from a base station to a mobile terminal. According to the IS-95 B (CDMA) standard, for example, a mobile terminal may transmit a single bit to the base station indicating whether the previous frame was in error or not, and the base station may adjust the downlink transmission power accordingly. An indication of a transmission error, however, may only provide a relatively crude indication of signal quality.

According to the IS-2000 and UMTS standards, the mobile terminal may instruct the base station to raise or lower the downlink transmission power by 1 dB depending on a quality of downlink transmissions received from the base station. The mobile terminal may, thus, perform additional processing steps to make the power control determinations.

According to the GSM and IS-136 standards, a provision for slow downlink power control may be based on signal quality measurements received by the base station from the mobile terminal at approximately 0.5 to 1 second intervals. Power control based on signal quality measurements received over 0.5 to 1.0 second intervals, however, may be unable to accommodate faster radio channel variations.

SUMMARY OF THE INVENTION

According to embodiments of the present invention, signal parameter information can be transmitted from a first communications device to a second communications device. For example, communications can be received at the first communications device from the second communications device, and a plurality of samples of a signal parameter can be generated characterizing the received communications. In addition, a plurality of delta-modulation values can be calculated responsive to the respective samples of the signal parameter wherein the plurality of delta-modulation values are associated with corresponding ones of the plurality of samples of the signal parameter characterizing the received communications. The delta-modulation values can be transmitted to the second communications device.

According to alternate aspects of the present invention, signal parameter information can be received at a first communications device from a second communication device. For example, communications can be transmitted from the first communications device to the second communications device, and communications can be received at the first communications device from the second communications device. In particular, the received communications can include a plurality of delta-modulation values representing a signal parameter characterizing the communications transmitted from the first communications device to the second communications device. A representation of the signal parameter can thus be reconstructed at the first communications device using the delta-modulation values.

DETAILED DESCRIPTION OF THE INVENTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
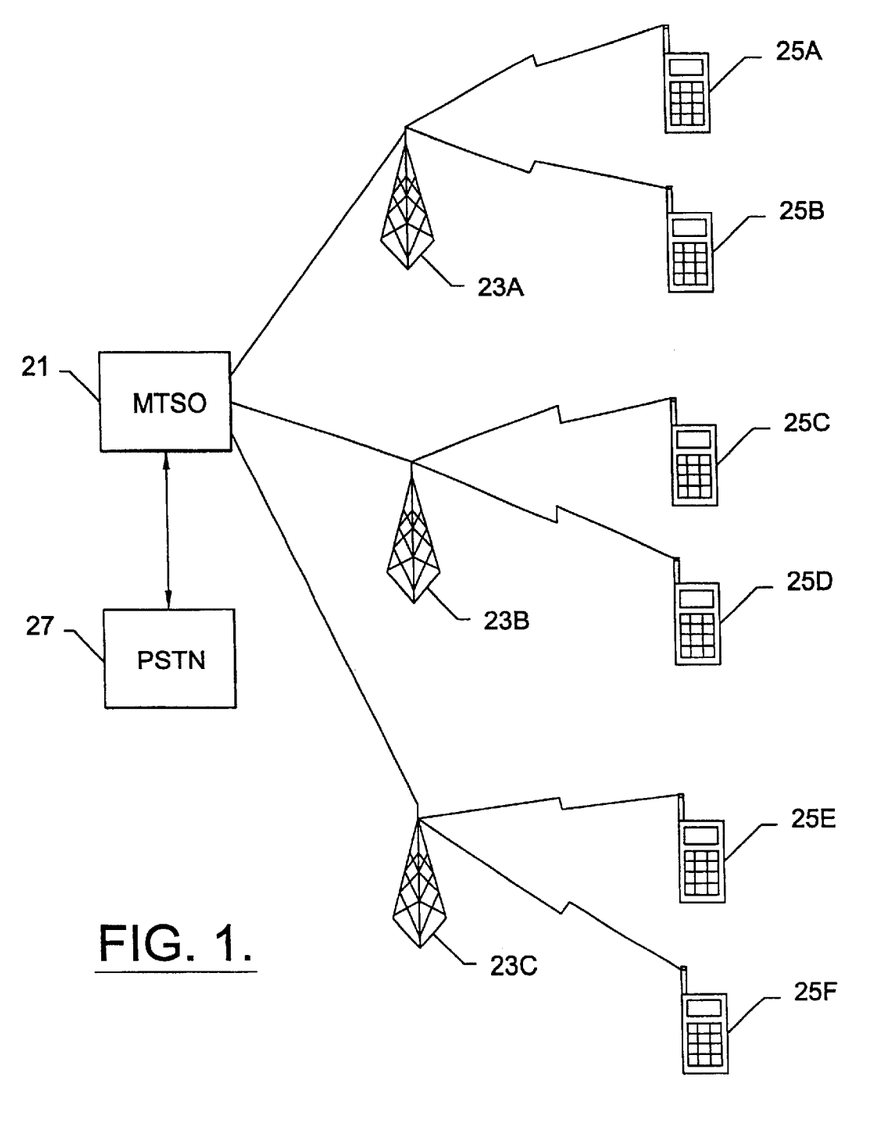
FIG. 1 is block diagram illustrating embodiments of communications systems according to the present invention.
Figure 2:
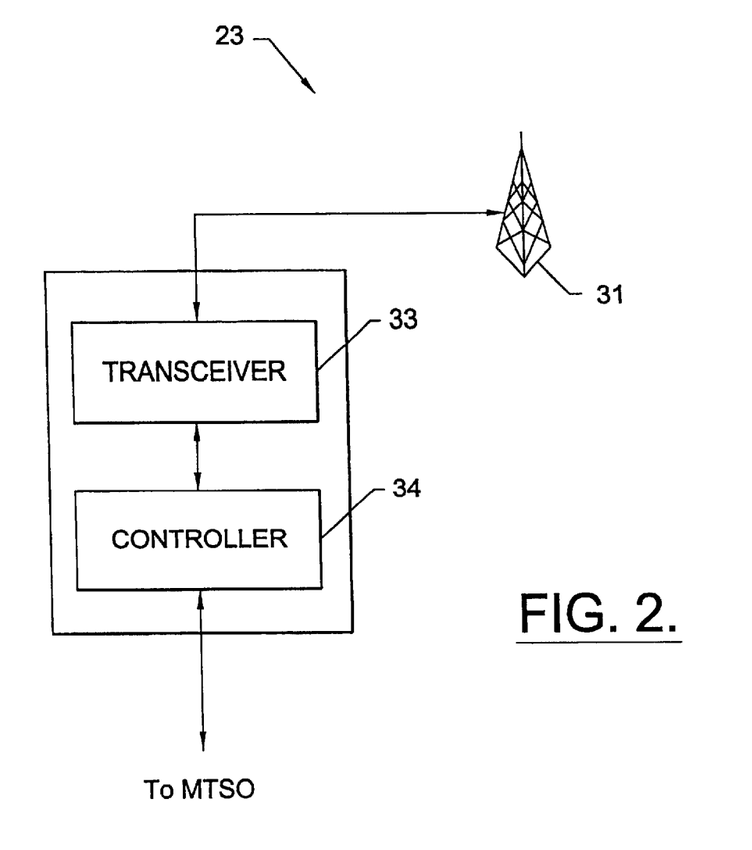
FIG. 2 is a block diagram illustrating embodiments of base stations according to the present invention.
Figure 3:
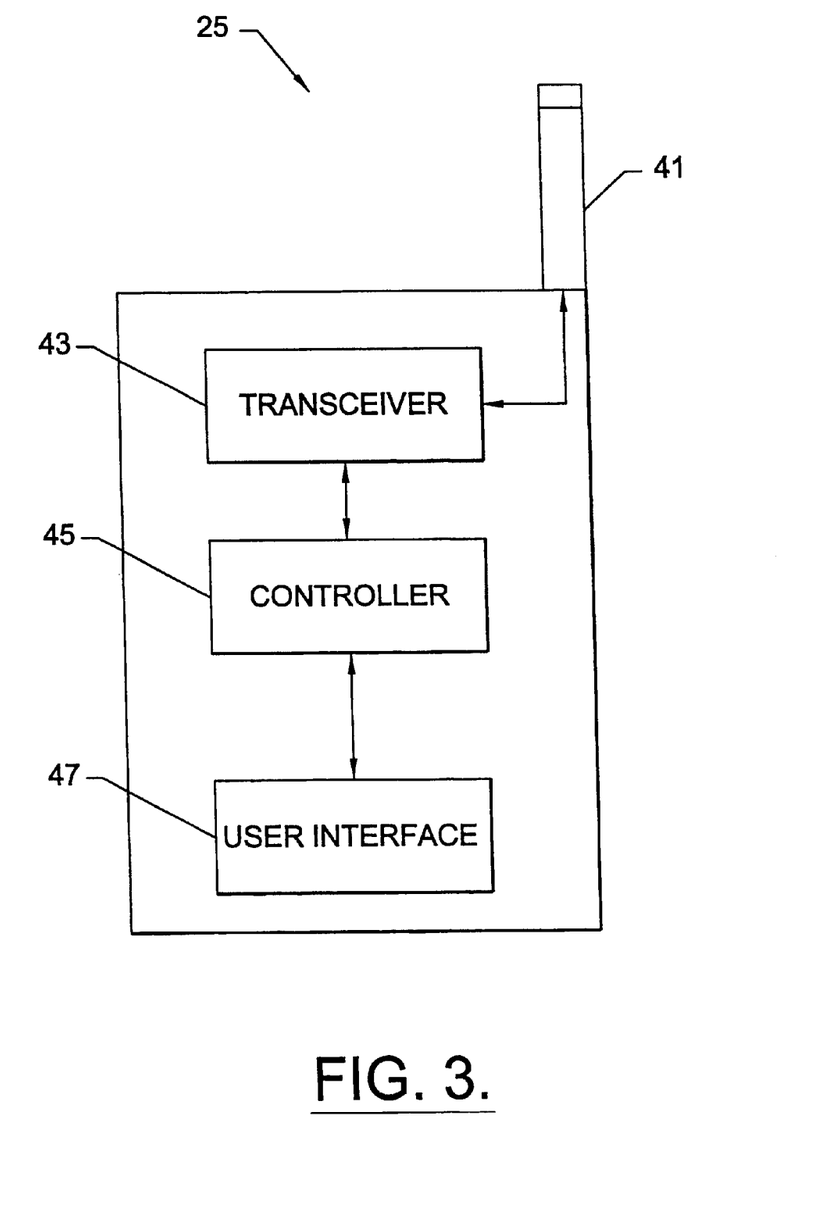
FIG. 3 is a block diagram illustrating embodiments of mobile terminals according to the present invention.

Embodiments according to the present invention are illustrated in FIGS. 1–3. As shown in FIG. 1, a cellular communications system including at least one mobile telephone switching office (MTSO) 21 and a plurality of base stations 23A–C may provide full duplex communications for a plurality of mobile terminals 25A–F. In particular, full duplex communications for each mobile terminal may be provided by a downlink channel from a base station 23A–C to a mobile terminal 25A–F and an uplink channel from a mobile terminal 25A–C to a base station 23A–F. While FIG. 1 illustrates a cellular communications system according to embodiments of the present invention, the present invention can be embodied in other communications systems, such as satellite communications systems.

Embodiments of individual base stations 23 according to the present invention are illustrated in FIG. 2, and embodiments of individual mobile terminals 25 are illustrated in FIG. 3. In the block diagram of FIG. 2, base station 23 may include one or more antennas mounted on a tower 31, a transceiver 33 (including a transmitter and a receiver) coupled to the one or more antennas, and a controller 34 coupled between the transceiver 33 and the mobile telephone switching office. While the base station 23 is illustrated as a terrestrial base station, the base station could alternately be implemented as a satellite relay station.

As shown in the block diagram of FIG. 3, the mobile terminal 25 may include an antenna 41, a transceiver 43 (including a transmitter and a receiver), a controller 45, and a user interface 47 wherein the user interface may include a microphone, a speaker, a keypad, and/or a visual display. The mobile terminal 25, for example, may be a cellular radiotelephone, a satellite radiotelephone, a personal digital assistant, a computer, or other communications device.

In order to increase communications capacity, time division multiple access (TDMA) channels may be used wherein a single frequency supports multiple channels by dividing the frequency over time into a repetitive time frame structure, with each frame being divided into time slots. A single downlink or uplink cannel can, thus, occupy one or more time slots in a plurality of time frames of a frequency, thereby leaving other time slots of the frequency for use by other channels. While TDMA channels will be discussed by way of example herein, other channels (such as FDMA or CDMA) may be used according to the present invention. Moreover, full duplex operations may generally be provided with the uplink and downlink channels for a mobile terminal being provided on different frequencies.

In providing communications over a downlink channel from a base station 23 to a mobile terminal 25, it may be desirable to dynamically control a transmission power over the downlink channel, for example, to reduce interference, provide dynamic range control, etc. Power control algorithms are discussed, for example, by J. F. Whitehead, "Signal-Level-Based Dynamic Power Control For Co-Channel Interference Management", Proc. VTC, May 1993, pp. 499–502; and Magnus Almgren et al., "Power Control In A Cellular System", IEEE VTC, May 1994, pp. 833–837. The disclosures of both of these references are hereby incorporated herein in their entirety by reference. According to various embodiments of the present invention, it may be desirable to implement a downlink transmission power control algorithm at the base station in a manner which may reduce processing needs at the mobile terminal.

When providing dynamic power control for transmissions from a base station 23 to a mobile terminal 25 over a downlink channel according to the present invention, knowledge of one or more signal parameters characterizing transmissions received by the mobile terminal 25 over the downlink channel may, thus, be desired at the base station. Accordingly, embodiments of the present invention may provide that a signal parameter characterizing transmissions received by the mobile terminal 25 are provided to the base station 23 so that the base station 23 can perform a power control algorithm to control transmission power over the downlink channel. For example, signal parameters such as signal-to-interference ratio, signal-to-noise ratio, or received signal strength may be provided by the mobile terminal 25 to the base station 23 to support a power control algorithm performed at the base station 23. While the use of signal-to-interference ratios will be discussed in more detail herein by way of example, other signal parameters (such as received signal strength) may alternatively be transmitted from the mobile terminal 25 to the base station 23 according to the present invention. Moreover, other factors such as transmission powers of other base stations, numbers/locations of other mobile terminals being serviced by the base station 23, etc., may be considered by a power control algorithm of the base station.

More particularly, a signal parameter such as a signal-to-interference ratio may be determined by the mobile terminal 25 for each time division multiple access (TDMA) burst received from the base station 23 over the downlink channel, wherein each TDMA burst may define a TDMA time slot. Each signal-to-interference ratio corresponding to a respective TDMA burst received over the downlink channel thus represents a sample of a generally time varying signal-to-interference ratio. This time varying signal-to-interference ratio, when provided to the base station 23, can provide a basis for varying power used to transmit communications to the mobile terminal 25 over the downlink channel. For example, an increased signal-to-interference ratio may indicate an ability to transmit over the downlink channel at lower power, while a reduced signal-to-interference ratio may indicate a need to transmit over the downlink channel at a higher power.

According to embodiments of the present invention, the mobile terminal 25 can calculate a plurality of delta-modulation values based on signal-to-interference ratios generated by the mobile terminal corresponding to respective TDMA bursts received at the mobile terminal 25. As used herein, "delta-modulation" refers to the approximation of analog data using a staircase function that moves up or down by a quantization level at each sampling time. Examples of delta-modulation are discussed, for example, by R. E. Ziemer et al., *Principles Of Communications: Systems, Modulation, And Noise*, Houghton Mifflin Company, Atlanta, 1976, pp. 141–142; and by W. Stallings, *Data And Computer Communications*, Macmillan Publishing Company, New York, 1985, pp. 84–87. The disclosures of these references are hereby incorporated herein by reference.

Figure 4:
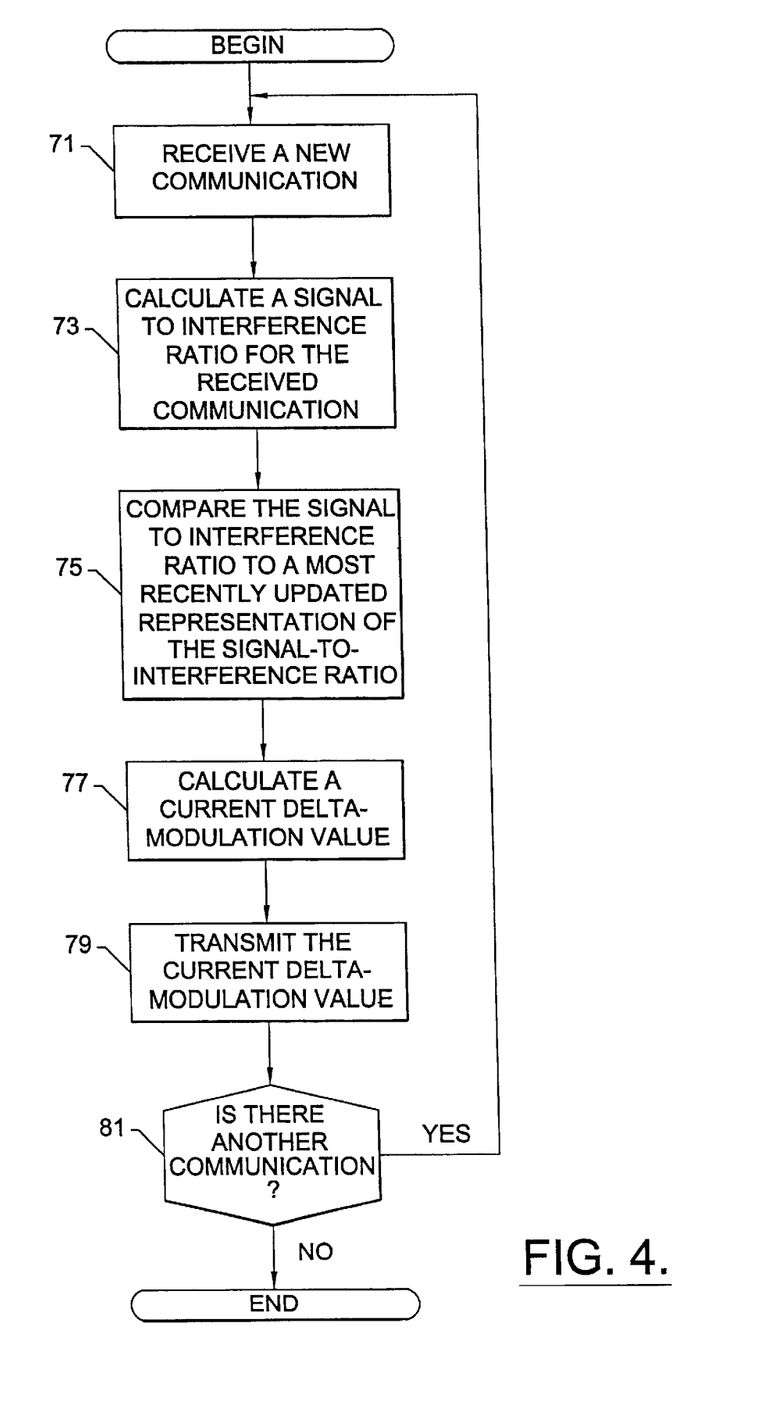
FIG. 4 is a flow chart illustrating operations of mobile terminals according to embodiments of the present invention.

Delta-modulation can be preformed at the mobile terminal 25 as illustrated in the flow chart of FIG. 4, by generating a representation of the signal-to-interference ratio wherein the representation is updated once for each sample of the signal-to-interference ratio calculated based on the respective communication (such as a TDMA burst) received. The representation of the signal-to-interference ratio may be generated once for each TDMA burst received, or the representation of the signal-to-interference ratio may be based on plurality of samples during a time window wherein the time window may include a plurality of TDMA bursts or wherein a plurality of such windows may be included in a single TDMA burst. Moreover, the representation of the signal-to-interference ratio need not be updated for every TDMA time slot, but may instead be updated at any rate suitable to provide a desired rate of control of downlink transmission power.

When a new communication (such as a new TDMA burst) is received (block 71), a corresponding new signal-to-interference ratio can be calculated (block 73), and the new signal-to-interference ratio is compared (block 75) to the most recently updated representation of the signal-to-interference ratio (calculated using the signal-to-interference ratio of the previously received communication such as a previously received TDMA burst). A current delta-modulation value is then calculated (block 77) based on the comparison of the current signal-to-interference ratio and the most recent value of the representation of the signal parameter. The calculated delta-modulation value is transmitted (block 79) to the base station 23, thereby allowing the base station 23 to reconstruct a representation of the signal-to-interference ratio. These operations can be repeated for each communication (such as a TDMA burst) received (decision block 81) or for selected ones of such communications until communications are complete.

An example of a one bit version of delta-modulation used with signal-to-interference ratios according to the present invention can be summarized according to the following formulas:

$$s(-1)=0;$$

$$b(n)=\text{sign}[c(n)-s(n-1)]; \text{ and}$$

$$s(n)=s(n-1)+\delta b(n).$$

In these formulas, b(n) represents the delta-modulation value corresponding to a newly received TDMA burst (received at time T=n); s(n−1) represents the most recent value of the reconstruction of the signal-to-interference ratio calculated after receiving the previous TDMA burst; c(n) represents the signal-to-interference ratio measured for the newly received TDMA burst; s(n) represents the value of the reconstruction of the signal-to-interference ratio calculated using the signal-to-interference ratio measured for the newly received TDMA burst; and δ represents the delta-modulation step size.

In this example of one bit delta-modulation, b(n) will have a one bit binary value of either 1 or zero representing either a positive (+) or negative (−) comparison of the signal-to-interference ratio c(n) measured for the newly received TDMA burst and the most recent value of the reconstruction of the signal-to-interference ratio s(n−1) calculated after receiving the previous TDMA burst. In other words, b(n) can be 1 indicating that c(n)>s(n−1) or 0 indicating that c(n)<s(n−1) (or vice-versa). The reconstruction of the signal-to-interference ratio s(n) is then updated by either adding or subtracting the delta-modulation step size δ to or from the most recent value of the reconstruction of the signal-to-interference ratio s(n−1) calculated after receiving the previous TDMA burst, and the updated reconstruction of the signal-to-interference ratio s(n) can then be saved to calculate the subsequent reconstruction of the signal-to-interference ratio s(n+1) and corresponding delta-modulation value b(n+1) after receiving the next TDMA burst at time n+1.

A single bit delta-modulation value b(n) can, thus, be transmitted from the mobile terminal 25 to the base station 23 for successive TDMA bursts received at the mobile terminal 25, thereby, allowing the base station 23 to reconstruct a time varying representation of the signal-to-interference ratio as measured at the mobile terminal. Because only a single bit needs to be transmitted to the base station 23 at a time (for example, once for each TDMA burst received at the mobile terminal 25), a relatively small amount of additional communications capacity is consumed conveying the time varying signal-to-interference ratio information to the base station 23. As discussed above, the delta-modulation values received by the base station 23 can be used by the base station 23 to reconstruct the time varying signal-to-interference ratio.

Using the one bit version of delta-modulation discussed above, the base station 23 can reconstruct the time varying signal-to-interference ratio using the following formulas:

$$C(-1)=0; \text{ and}$$

$$C(n)=C(n-1)+\delta b(n).$$

In these formulas, C(n) represents the reconstruction of the signal-to-interference ratio calculated for the TDMA burst received by the mobile terminal 25 at time T=n. As shown, the reconstruction of the signal-to-interference ratio C(n) at time T=n is equal to the reconstruction of the signal-to-interference ratio C(n−1) at T=n−1 plus or minus the step size δ depending on the value of the delta-modulation value b(n) for time T=n. The base station 23 can, thus, reconstruct a time varying signal-to-interference ratio for the TDMA bursts received by the mobile terminal 25 wherein an accuracy of the reconstructed signal-to-interference ratio may be a function of, for example, quantizing noise and slope overload noise.

Figure 5:
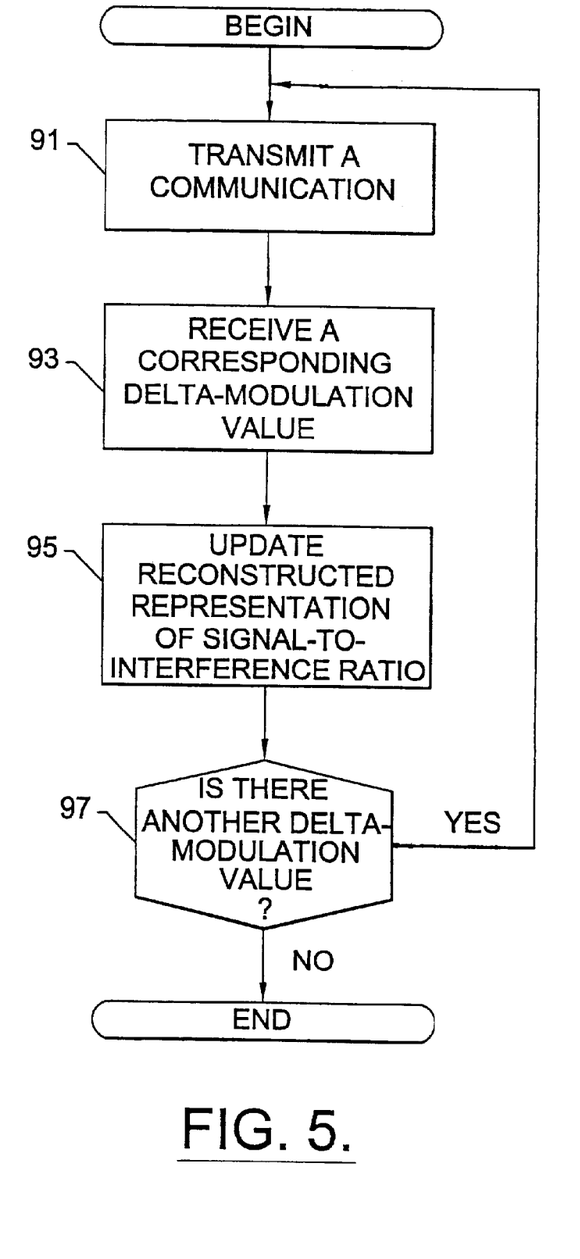
FIG. 5 is a flow chart illustrating operations of base stations according to embodiments of the present invention.

As shown in the flow chart of FIG. 5, the base station 23 can transmit a communication (block 91) to the mobile terminal 25 wherein a delta-modulation value based on the transmitted communication may be calculated by the mobile terminal as discussed above and transmitted back to the base station 25. The base station 23 can receive the delta-modulation value (block 93) and update its reconstructed representation of the signal-to-interference ratio (block 95). These operations can be repeated, for example, for each communication transmitted (decision block 97), until the communication is complete.

While one bit delta-modulation with a constant step size is discussed above, multi-bit delta-modulation may be used to support a variable step size. Alternately, one bit delta-modulation may be used wherein the step size is increased after a predetermined number of consecutive positive or negative delta-modulation values, for example, to reduce slope overload noise, and/or wherein the step size is decreased after a predetermined number of alternating positive and negative delta-modulation values, for example, to reduce quantizing noise.

Figure 6:
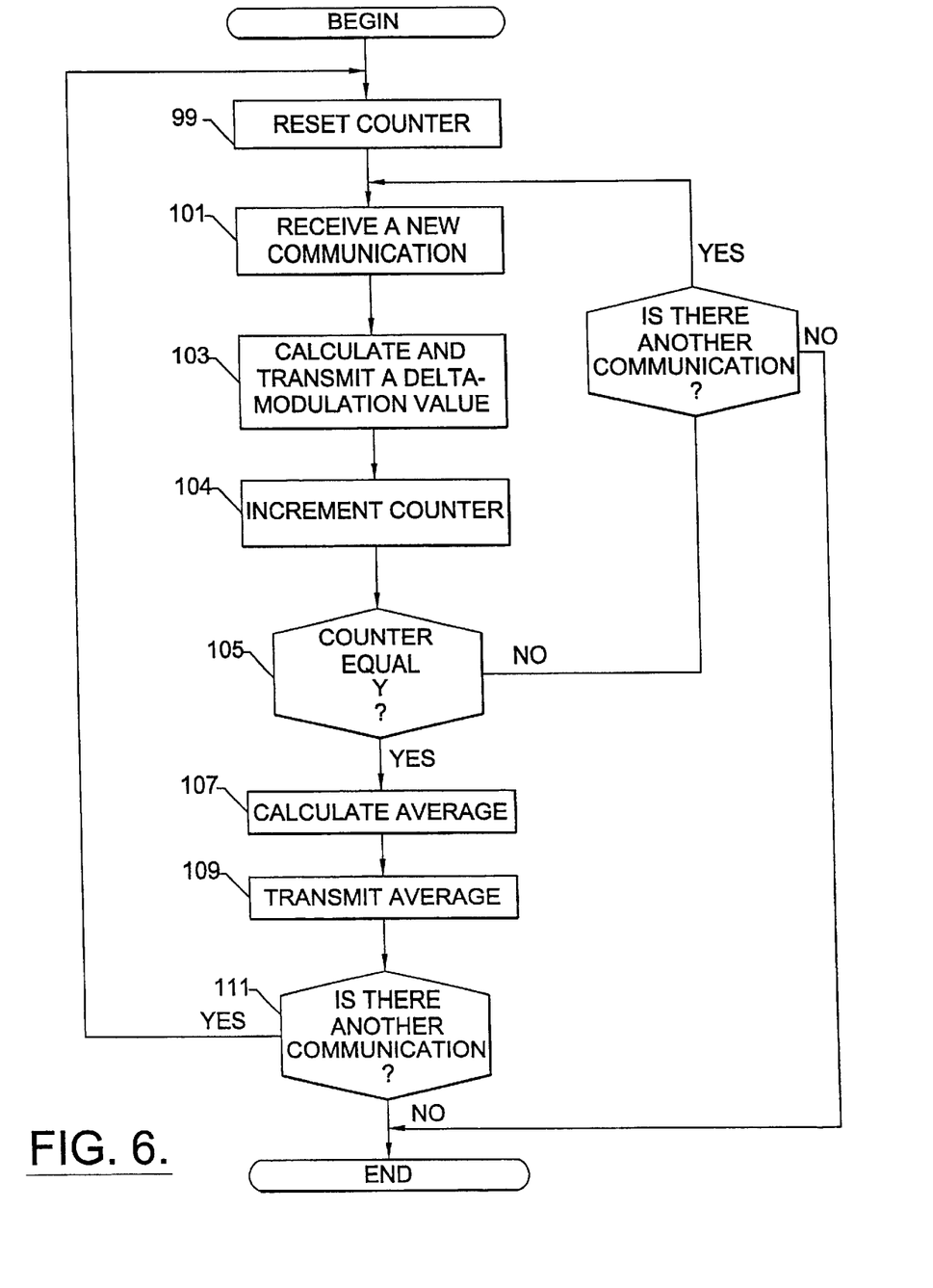
FIG. 6 is a flow chart illustrating additional operations of mobile terminals according to embodiments of the present invention.

As shown in the flow chart of FIG. 6, the mobile terminal 25 may calculate an average signal-to-interference ratio over a number of TDMA bursts received, and the average may be transmitted to the base station 23 once for a predetermined number y of TDMA bursts received. In particular, the mobile terminal may initially reset a counter (block 99). The mobile terminal may then receive a communication (block 101), such as a TDMA burst, and calculate and transmit a corresponding delta-modulation value (block 103) as discussed above with regard to blocks 71, 73, 75, 77, and 79 of FIG. 4. For each delta-modulation value calculated and transmitted, the counter may be incremented (block 104), and a determination made if the number of transmitted delta-modulation values is equal to the predetermined number y by checking the counter (decision block 105).

If the counter is equal to y, the mobile terminal can calculate (block 107) and transmit (block 109) an average of the signal-to-interference ratios for one or more of the received communications, for example, an average of all y signal-to-interference ratios. Accordingly, if the number of received communications is equal to y (decision block 105), an average for the signal-to-interference ratios is calculated (block 107) and transmitted (block 109). If there is another communication (decision block 111), the counter can be reset (block 99) and the mobile terminal may prepare to receive the next communication.

If the counter is not equal to y (decision block 105), the mobile terminal can receive the next communication (block 101) without resetting the counter. The operations of FIG. 6 can be repeated until there are no additional communications to receive. Stated in other words, while a delta-modulation value can be transmitted for every TDMA burst received, an average signal-to-interference ratio for a predetermined number of TDMA bursts received may only be transmitted to the base station 23 once for a selected interval, such as an interval including the predetermined number of TDMA bursts received.

Figure 7:
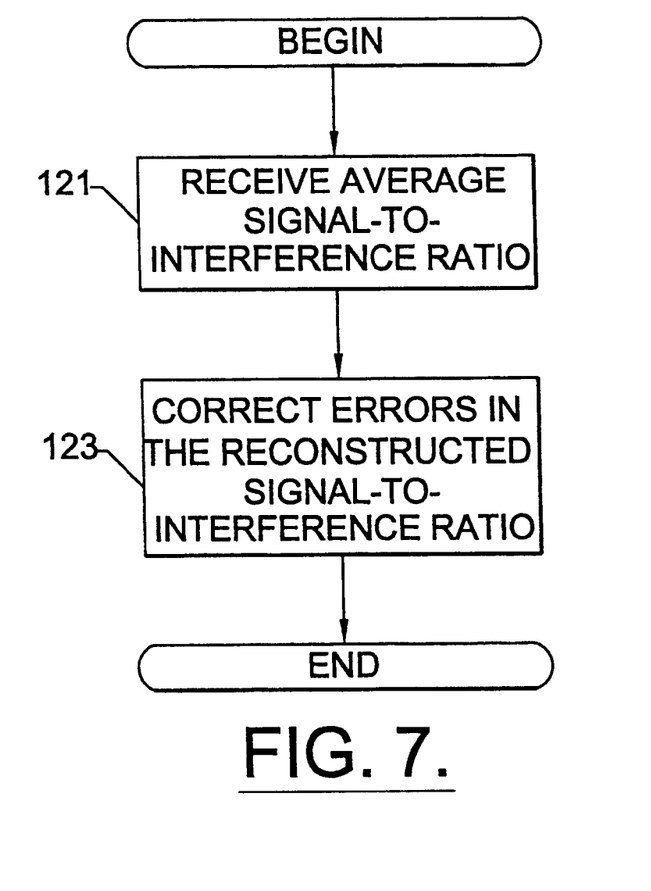
FIG. 7 is a flow chart illustrating additional operations of base stations according to embodiments of the present invention.

As shown in the flow chart of FIG. 7, the average signal-to-interference ratio can be received by the base station 23 (block 121), and the average can be used to correct any errors in the signal-to-interference ratio (block 123) reconstructed at the base station 23. Errors in the reconstruction of the signal-to-interference ratio at the base station 23 resulting from errors in the calculation, transmission, and/or reception of the delta-modulation value can, thus, be corrected at the base station 23 using the received average signal-to-interference ratio. For example, the average signal-to-interference ratios can be used to reset the average value of the reconstructed signal-to-interference ratio which may improve the accuracy of the reconstructed signal-to-interference ratio. More particularly, errors transmitting and/or receiving delta-modulation modulation values may result in errors in the signal-to-interference ratio reconstructed at the base station. A comparison (at the base station) of the average transmitted by the mobile terminal and an average calculated by the base station (using the reconstruction of the signal-to-interference ratio at the base station) can be used to correct the reconstruction of the signal-to-interference ratio at the base station.

According to embodiments of the present invention, the delta-modulation values can each be transmitted as a portion of a respective TDMA burst on the uplink channel from the mobile terminal 25 to the base station 23. For example, each delta-modulation value could be transmitted as a single bit of a respective TDMA burst from the mobile terminal 25 to the base station 23 so that only a relatively small amount of additional capacity is consumed. The average signal-to-interference ratio could, for example, be transmitted by the mobile terminal 25 to the base station 23 over a control channel (such as a slow associated control channel) so that no additional burden is placed on the uplink communications channel.

According to embodiments of the present invention, signal parameter information can thus be transmitted from a first communications device (such as a mobile terminal 25) to a second communications device (such as a base station 23). In particular, communications can be received at the first communications device from the second communications device, and a plurality of samples of a signal parameter characterizing the received communications can be generated. A plurality of delta-modulation values can be calculated responsive to the respective samples of the signal parameter wherein the plurality of delta-modulation values represent the signal parameter characterizing the received communications, and the delta-modulation values can be transmitted to the second communications device.

According to various embodiments, the received communications can comprise a plurality of time division multiple access (TDMA) bursts during respective time division multiple access (TDMA) time frames, and a respective sample of the signal parameter can be generated for one or more of the (TDMA) bursts. In addition, each sample of the signal parameter may represent a signal-to-interference ratio for the respective time division multiple access (TDMA) burst received by the first communication device. According to additional exemplary embodiments, the first communications device can also calculate an average value of the signal parameter using a predetermined number of the samples, and transmit the average value of the signal parameter to the second communications device.

According to alternate embodiments of the present invention, signal parameter information can be received at a first communications device (such as a base station 23) from a second communications device (such as a mobile terminal 25). In particular, communications can be transmitted from the first communications device to the second communications device, and communications can be received at the first communications device from the second communications device. The communications received at the first communications device can include a plurality of delta-modulation values representing a signal parameter characterizing the communications transmitted from the first communications device to the second communications device, and the delta-modulation values can be used to reconstruct a representation of the signal parameter. Moreover, a transmission power of communications transmitted to the second communications device can be altered as a function of the reconstructed representation of the signal parameter.

According to various embodiments, the communications can be transmitted from the first communications device as a plurality of time division multiple access (TDMA) bursts during respective time division multiple access (TDMA) time frames, and each of the delta-modulation values can correspond to a respective time division multiple access (TDMA) burst transmitted from the first communications device to the second communications device. In addition, the signal parameter can be a signal-to-interference ratio for the communications transmitted from the first communications device to the second communications device. According to additional embodiments, the first communications device can receive an average value of the signal parameter, and the first communication device can correct the reconstructed representation of the signal parameter using the average value of the signal parameter.

Methods, systems, and devices according to the present invention can thus provide fast downlink power control while reducing communications capacity consumed on the uplink and/or reducing processing overhead for the device receiving the downlink. When implemented in a TDMA system using one-bit delta-modulation, a single delta-modulation value can be calculated for one of the downlink TDMA bursts and transmitted with the subsequent uplink TDMA burst. Moreover, the device transmitting the downlink can implement a downlink power control algroithm using signal parameters reconstructed from the delta-modulation values.

In embodiments where the downlink is from a base station to a mobile terminal, aspects of the present invention may allow downlink power control algorithms to be advantageously implemented at the base station where updates and improvements can be implemented relatively easily without updating or replacing numerous mobile terminals. In other words, aspects of the present invention allow the reconstruction of a signal parameter (such as a time varying signal-to-interference ratio) at the base station wherein the signal parameter information can be used by any desired power control algorithm. Moreover, when implemented in a TDMA system, the use of delta-modulation allows the reconstruction of a signal parameter at the base station based on samples representing each TDMA burst received by the mobile terminal over the downlink. A near real time representation of the signal parameter can thus be reconstructed at the base station based on samples of the signal parameter taken at a sampling rate equal to (or a multiple of) the TDMA frame period.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of transmitting signal parameter information from a first communications device to a second communications device, said method comprising:

receiving communications at the first communications device from the second communications device wherein receiving communications from the second communications device comprises receiving a plurality of time division multiple access (TDMA) bursts during respective time division multiple access (TDMA) time frames;

generating a plurality of samples of a signal parameter characterizing the received communications wherein each sample of the signal parameter represents a signal-to-interference ratio for the respective time division multiple access (TDMA) burst received by the first communication device;

calculating a plurality of delta-modulation values responsive to the respective samples of the signal parameter wherein the plurality of delta-modulation values are associated with corresponding ones of the plurality of samples of the signal parameter characterizing the received communications; and transmitting the delta-modulation values to the second communications device.

2. A method according to claim 1 wherein generating the plurality of samples of the signal parameter comprises generating a respective sample for each of the (TDMA) bursts.

3. A method according to claim 1 further comprising the steps of:

receiving the delta-modulation values transmitted to the second communications device at the second communications device; and reconstructing a representation of the signal parameter at the second communications device using the received delta-modulation values.

4. A method according to claim 3, further comprising the step of:

controlling transmission power to the first communication device using the reconstruction of the signal parameter at the second communications device.

5. A method according to claim 1 wherein the signal parameter comprises a signal-to-interference ratio and wherein each of the samples of the signal parameter comprise readings of the signal-to-interference ratio for a corresponding time period.

6. A method according to claim 1 further comprising the step of:

calculating an average value of the signal parameter using a selected number of the samples; and transmitting the average value of the signal parameter to the second communications device.

7. A method according to claim 1 wherein the first communications device comprises a mobile terminal and the second communications device comprises a base station.

8. A method according to claim 1 wherein the first communications device comprises a base station and the second communications device comprises a mobile terminal.

9. A method of transmitting signal parameter information from a first communications device to a second communications device, said method comprising:

receiving communications at the first communications device from the second communications device wherein receiving communications from the second communications device comprises receiving a plurality of time division multiple access (TDMA) bursts during respective time division multiple access (TDMA) time frames, generating a plurality of samples of a signal parameter characterizing the received communications;

calculating a plurality of delta-modulation values responsive to the respective samples of the signal parameter wherein the plurality of delta-modulation values are associated with corresponding ones of the plurality of samples of the signal parameter characterizing the received communications wherein calculating a plurality of delta-modulation values comprises, generating a representation of the signal parameter wherein the representation is updated once for ones of a plurality of previously received TDMA bursts, comparing a current one of the samples of the signal parameter corresponding to a current TDMA burst with a most recent value of the representation of the signal parameter generated using ones of the previously received TDMA bursts, and calculating a current delta-modulation value based on comparing the current one of the sample with the most recent value of the representation of the signal parameter; and transmitting the delta-modulation values to the second communications device.

10. A method according to claim 9 wherein transmitting the delta-modulation values to the second communications device comprises transmitting the current delta-modulation value to the second communications device, and wherein generating the representation of the signal parameter further includes updating the representation of the signal parameter using the current delta-modulation value.

11. A method of receiving signal parameter information at a first communications device from a second communications device, said method comprising:

transmitting communications from the first communications device to the second communications device;

receiving communications at the first communications device from the second communications device wherein the received communications include a plurality of delta-modulation values representing a signal parameter characterizing the communications transmitted from the first communications device to the second communications device; and reconstructing a representation of the signal parameter at the first communications device using the delta-modulation values representing the signal parameter.

12. A method according to claim 11, further comprising the step of:

altering transmission power used transmitting communications from the first communications device to the second communications device as a function of the reconstructed representation of the signal parameter.

13. A method according to claim 11, wherein transmitting communications from the first communications device comprises transmitting a plurality of time division multiple access (TDMA) bursts during respective time division multiple access (TDMA) time frames.

14. A method according to claim 13, wherein each of the delta-modulation values corresponds to a respective time division multiple access (TDMA) burst transmitted from the first communications device to the second communications device.

15. A method according to claim 14 wherein the signal parameter comprises a signal-to-interference ratio for the communications transmitted from the first communications device to the second communications device.

16. A method according to claim 11 wherein reconstructing a representation of the signal parameter at the first communications device comprises:

generating a representation of the signal parameter wherein the representation is updated once each for ones of a plurality of previously received delta-modulation values; and updating the representation of the signal parameter using a current one of the delta-modulation values.

17. A method according to claim 11 further comprising:
receiving an average value of the signal parameter at the first communications device from the second communications device; and
correcting the reconstructed representation of the signal parameter using the average value of the signal parameter.

18. A method according to claim 11 wherein the first communications device comprises a base station and the second communications device comprises a mobile terminal.

19. A communications device comprising:
means for receiving communications from a second communications device wherein the means for receiving communications from the second communications device comprises means for receiving a plurality of time division multiple access (TDMA) bursts during respective time division multiple access (TDMA) time frames;
means for generating a plurality of samples of a signal parameter characterizing the received communications wherein each sample of the signal parameter represents a signal-to-interference ratio for the respective time division multiple access (TDMA) burst received by the communications device;
means for calculating a plurality of delta-modulation values responsive to the respective samples of the signal parameter wherein the plurality of delta-modulation values are associated with corresponding ones of the plurality of samples of the signal parameter characterizing the received communications; and
transmitting the delta-modulation values to the second communications device.

20. A communications device according to claim 19 wherein the means for generating the plurality of samples of the signal parameter comprises means for generating a respective sample for each of the (TDMA) bursts.

21. A communications device according to claim 19 wherein the delta-modulation values transmitted to the second communications device are used by the second communications device to reconstruct a representation of the signal parameter.

22. A communications device according to claim 21 wherein the representation of the signal parameter is used by the second communications device for control of transmission power to the first communications device.

23. A communications device according to claim 19 wherein the signal parameter comprises a signal-to-interference ratio and wherein each of the samples of the signal parameter comprise readings of the signal-to-interference ratio for a corresponding time period.

24. A communications device according to claim 19 further comprising:
means for calculating an average value of the signal parameter using a selected number of the samples; and
means for transmitting the average value of the signal parameter to the second communications device.

25. A communications device according to claim 19 wherein the first communications device comprises a mobile terminal and the second communications device comprises a base station.

26. A communications device comprising:
means for receiving communications from a second communications device wherein the means for receiving communications from the second communications device comprises means for receiving a plurality of time division multiple access (TDMA) bursts during respective time division multiple access (TDMA) time frames;
means for generating a plurality of samples of a signal parameter characterizing the received communications;
means for calculating a plurality of delta-modulation values responsive to the respective samples of the signal parameter wherein the plurality of delta-modulation values are associated with corresponding ones of the plurality of samples of the signal parameter characterizing the received communications wherein the means for calculating a plurality of delta-modulation values comprises,
means for generating a representation of the signal parameter wherein the representation is updated once for ones of a plurality of previously received TDMA bursts,
means for comparing a current one of the samples of the signal parameter corresponding to a current TDMA burst with a most recent value of the representation of the signal parameter generated using ones of the previously received TDMA bursts, and
means for calculating a current delta-modulation value based on comparing the current one of the samples with the most recent value of the representation of the signal parameter; and
transmitting the delta-modulation values to the second communications device.

27. A communications device according to claim 26 wherein the means for transmitting the delta-modulation values to the second communications device comprises means for transmitting the current delta-modulation value to the second communications device, and wherein the means for generating the representation of the signal parameter further includes updating the representation of the signal parameter using the current delta-modulation value.

28. A communications device comprising:
means for transmitting communications to a second communications device;
means for receiving communications from the second communications device wherein the received communications include a plurality of delta-modulation values representing a signal parameter characterizing the communications transmitted from the first communications device to the second communications device; and
means for reconstructing a representation of the signal parameter using the delta-modulation values representing the signal parameter.

29. A communications device according to claim 28 wherein each of the delta-modulation values corresponds to a respective time division multiple access (TDMA) burst transmitted from the first communications device to the second communications device.

30. A communications device according to claim 29 wherein the signal parameter comprises a signal-to-interference ratio for the communications transmitted to the second communications device.

31. A communications device according to claim 28 wherein the means for reconstructing a representation of the signal parameter comprises:
means for generating a representation of the signal parameter wherein the representation is updated once each for ones of a plurality of previously received delta-modulation values; and means for updating the representation of the signal parameter using a current one of the delta-modulation values.

32. A communications device according to claim 28 further comprising:
means for receiving an average value of the signal parameter at the first communications device from the second communications device; and
means for correcting the reconstructed representation of the signal parameter using the average value of the signal parameter.

33. A communications device according to claim 28 wherein the first communications device comprises a base station and the second communications device comprises a mobile terminal.

34. A communications device comprising:
a receiver that receives communications from a second communications device wherein the receiver receives a plurality of time division multiple access (TDMA) bursts during respective time division multiple access (TDMA) time frames;
a controller coupled to the receiver wherein the controller generates a plurality of samples of a signal parameter characterizing the received communications and wherein the controller calculates a plurality of delta-modulation values responsive to the respective samples of the signal parameter wherein the plurality of delta-modulation values are associated with corresponding ones of the plurality of samples of the signal parameter characterizing the received communications wherein each sample of the signal parameter represents a signal-to-interference ratio for the respective time division multiple access (TDMA) burst received by the communications device; and
a transmitter coupled with the controller wherein the transmitter transmits the delta-modulation values to the second communications device.

35. A communications device according to claim 34 wherein the controller generates a respective sample for each of the (TDMA) bursts.

36. A communications device according to claim 34 wherein the delta-modulation values transmitted to the second communications device are used by the second communications device to reconstruct a representation of the signal parameter.

37. A communications device according to claim 36 wherein the representation of the signal parameter is used by the second communications device for control of transmission power to the first communications device.

38. A communications device according to claim 34 wherein the signal parameter comprises a signal-to-interference ratio and wherein each of the samples of the signal parameter comprise readings of the signal-to-interference ratio for a corresponding time period.

39. A communications device according to claim 34 wherein the controller calculates an average value of the signal parameter using a selected number of the samples, and wherein the transmitter transmits the average value of the signal parameter to the second communications device.

40. A communications device according to claim 34 wherein the first communications device comprises a mobile terminal and the second communications device comprises a base station.

41. A communications device comprising:
a receiver that receives communications from a second communications device wherein the receiver receives a plurality of time division multiple access (TDMA) bursts during respective time division multiple access (TDMA) time frames;
a controller coupled to the receiver wherein the controller generates a plurality of samples of a signal parameter characterizing the received communications and wherein the controller calculates a plurality of delta-modulation values responsive to the respective samples of the signal parameter wherein the plurality of delta-modulation values are associated with corresponding ones of the plurality of samples of the signal parameter characterizing the received communications wherein the controller generates a representation of the signal parameter wherein the representation is updated once for ones of a plurality of previously received TDMA bursts, compares a current one of the samples of the signal parameter corresponding to a current TDMA burst with a most recent value of the representation of the signal parameter generated using ones of the previously received TDMA bursts, and calculates a current delta-modulation value based on comparing the current one of the samples with the most recent value of the representation of the signal parameter; and
a transmitter coupled with the controller wherein the transmitter transmits the delta-modulation values to the second communications device.

42. A communications device according to claim 41 wherein the transmitter transmits the current delta-modulation value to the second communications device, and wherein the controller updates the representation of the signal parameter using the current delta-modulation value.

43. A communications device comprising:
a transmitter that transmits communications to a second communications device;
a receiver that receives communications from the second communications device wherein the received communications include a plurality of delta-modulation values representing a signal parameter characterizing the communications transmitted from the first communications device to the second communications device; and
a controller coupled to the transmitter and receiver wherein the controller reconstructs a representation of the signal parameter using the delta-modulation values representing the signal parameter.

44. A communications device according to claim 43 wherein the transmitter is further configured to alter a transmission power as a function of the reconstructed representation of the signal parameter.

45. A communications device according to claim 43 wherein the transmitter is configured to transmit a plurality of time division multiple access (TDMA) bursts during respective time division multiple access (TDMA) time frames.

46. A communications device according to claim 45 wherein each of the delta-modulation values corresponds to a respective time division multiple access (TDMA) burst transmitted from the first communications device to the second communications device.

47. A communications device according to claim 46 wherein the signal parameter comprises a signal-to-interference ratio for the communications transmitted to the second communications device.

48. A communications device according to claim 43 wherein the controller is further configured to generate a representation of the signal parameter wherein the representation is updated once each for ones of a plurality of previously received delta-modulation values, and wherein the controller is configured to update the representation of the signal parameter using a current one of the delta-modulation values.

49. A communications device according to claim 43 wherein the receiver is configured to receive an average value of the signal parameter from the second communications device, and wherein the controller is configured to correct the reconstructed representation of the signal parameter using the average value of the signal parameter.

50. A communications device according to claim 43 wherein the first communications device comprises a base station and the second communications device comprises a mobile terminal.

\* \* \* \* \*